United States Patent Office 3,388,656
Patented June 18, 1968

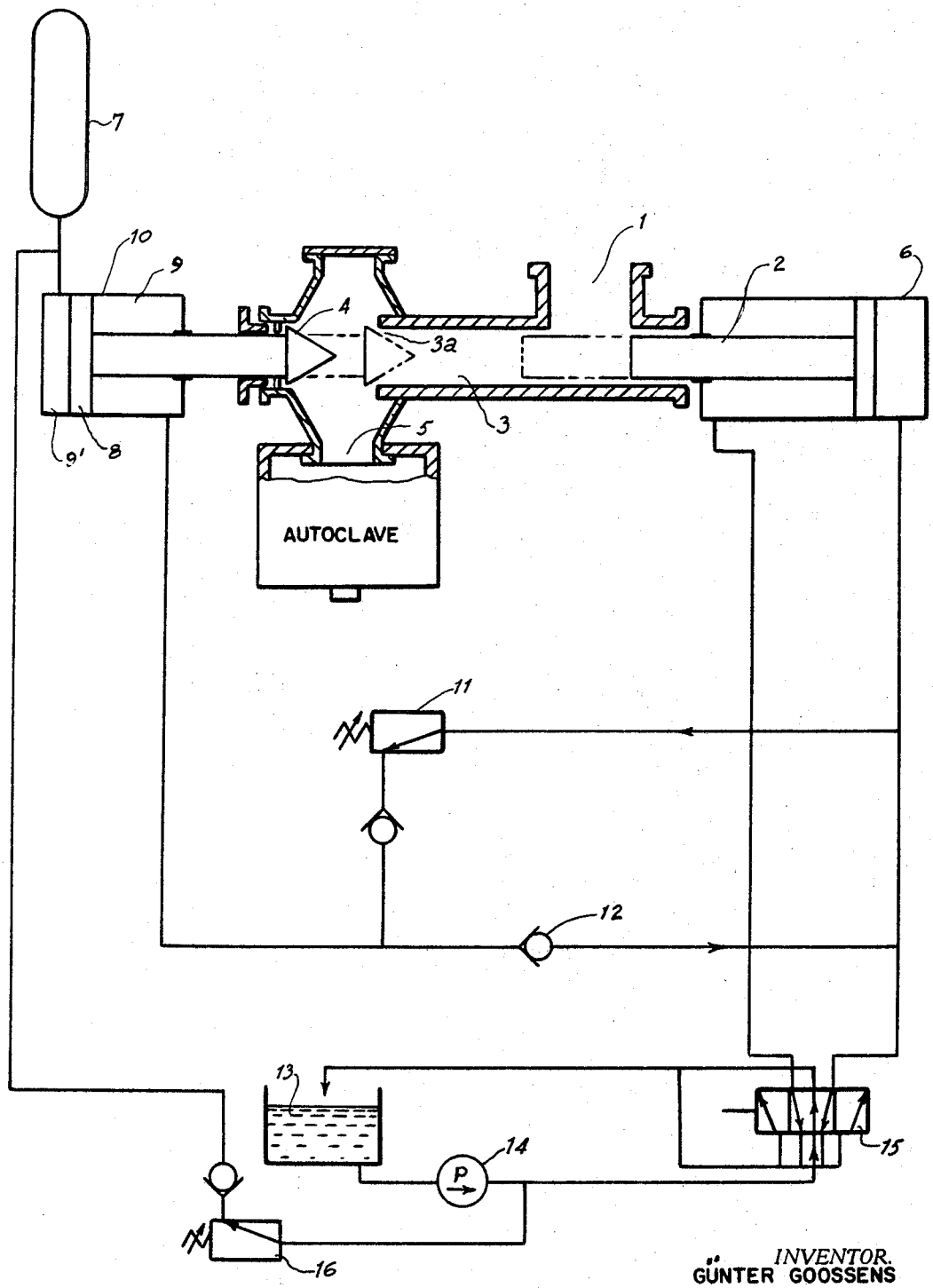

3,388,656
DEVICE FOR THE INTRODUCTION OF POWDERED OR GRAINY SOLIDS INTO PRESSURE VESSELS OR THEIR REMOVAL THEREFROM
Günter Goossens, Domat-Ems, Grisons, Switzerland, assignor to Inventa A.G. fur Forschung und Patentverwertung, Zurich, Switzerland
Filed Nov. 24, 1964, Ser. No. 413,450
Claims priority, application Switzerland, Nov. 29, 1963, 14,623/63
1 Claim. (Cl. 100—50)

ABSTRACT OF THE DISCLOSURE

An extruder for charging comminuted solids into pressure vessels. These solids are pressed into the form of a plug which crumbles upon discharge. The salient feature of the device is a direct hydraulic connection between the pressure cylinder and the molding cylinder. This direct connection is provided with a pressure limiting valve and a relief valve and provides a pressure equilibrium, also preventing jamming of the plug in the mold chamber.

---

The invention relates to a device for the introduction of powdered or grainy materials into pressure vessels and their removal therefrom and, more particularly, to an automatic regulating device in such machines.

The problem frequently is encountered in the chemical process industry, whereby dry powdered or grainy reactants are to be introduced into autoclaves under steam pressure or whereby these are to be removed from the autoclave. This can be accomplished, e.g., by means of extruders. These are employed especially for viscous substances whose flow properties are decreased even by the acceptance of very small quantities of steam from the autoclave which, however, can be molded into pressure-resistant and tight plugs, as in the case, e.g., with terephthalic acid. This material can be briquetted without the addition of a binder.

The modus operandi of an extruder for the introduction of such substances now will be further explained with reference to the accompanying drawing which is a schematic of such an extruder, also showing the improvements according to the invention, as will later on become more fully apparent.

The substances are introduced into the extruder through a funnel-shaped inlet 1 above a pressure piston 2 while the latter is in retracted position. The piston is actuated hydraulically, hydraulic pressure being exerted by means of oil. During the pressure stroke, the substance is pressed into the actual mold 3. The same is a cylinder open on both ends, aligned with the axis of the piston. At the end opposite piston 2 the cylinder is closed by a cone 4 which has a cone angle of 60°. When the pressure at the piston head reaches approximately 250 to 300 kg./cm.$^2$, the substance introduced forms a plug which has sufficient strength and adhesion to the wall of the mold to safely sustain a steam pressure of approximately 5 kg./cm.$^2$. The values named are valid for terephthalic acid and for a plug having a diameter of 40 mm. and a length of 350 mm.

Cone 4, closing the mold 3, now can be retracted far enough to set free the annular opening 3a of the cylinder opening. Upon the return stroke of piston 2, the extruder again is loaded. The ensuing molding cycle occurs against the plug already present which thereby is advanced, crumbles upon exiting from the mold, and falls into the autoclave through outlet 5 which is connected to said autoclave.

The material introduced into the mold by the second stroke now forms a new plug. This cycle can be repeated as often as desired whereby the pressure space remains tightly closed by means of the solidly pressed (or molded) plug. Cone 4 assumes a portion of the counterforce to the pressing force exerted by the piston, upon the molding cycle. Another portion corresponds to the internal pressure of the autoclave. The remaining counterforce is introduced into the mold wall through friction of the plug. Hence, the mold force and, thus, the strength of the plug can be regulated by longitudinal displacement of cone 4, whereby the annular exit cross section is changed.

In the past, this had been accomplished manually by means of a worm gear spindle. For the control of the molding force a manometrical control of the oil pressure in the molding cylinder 6 had been used.

The known device just described suffers from certain considerable drawbacks. For instance, when first starting up after a shutdown of the extruder press or upon a changeover to a new substance having different mechanical properties, e.g., different crystal shape and size, frictional behavior, etc., no position can be found for cone 4 which effects a constant molding force during a plurality of strokes so that even after prolonged running of the machine, adjustment of the cone is required in order to avoid a jamming of the piston or the molding of loose plugs, so that manual servicing and constant regulation are inevitable. This is highly undesirable in large-scale production.

The object of the invention is a device devoid of the disadvantages named above, i.e., a device provided with an automatic regulator featuring hydraulic positioning of the counterpressure organ, i.e., the cone. The device according to the invention, serving for the introduction of powdered or grainy materials into pressure vessels consists of a hydraulic extruder or press which pushes the materials into a mold and of a counterorgan acting elastically against the mold opening. The counterorgan can be pushed back by the portion of the total press energy not consumed by the friction against the mold wall so that the plug formed in the mold and extruded therefrom is crushed by this counterorgan, the broken pieces then entering the pressure vessel connected to the extruder. The device is characterized by the feature that between the cylinder space of the mold in the extruder and the cylinder space of the regulating cylinder of the counterorgan an adjustable pressure transmission device is disposed which limits the wall friction of the plug formed, by timely release of the same, so that said friction does not surpass the total press energy.

In a special embodiment, this pressure transmission consists of hydraulic connection system containing a pressure relief valve and a release valve.

The operation of the device according to the invention now will be explained with reference to the drawing. The counterpressure organ in the case at hand is the cone 4 which is pressed hydraulically against the annular opening 3a of mold 3 by means of piston 8, actuated through the accumulator 7, with a pressure of approximately 1000–2000 kg. The portion of the press energy acting on cone 4 presses the same back so far that, upon uniform press energy, the material leaves the mold, in form of a plug, through the annular opening 3a. The accumulator tank 7 thereby serves as the elastic element. The cylinder space 9 of the regulating cylinder 10 thereby is expanded, and cylinder space 9' correspondingly decreased. The pressure difference set at the pressure limiting valve 11 is exceeded so that hydraulic fluid (oil) flows from the pressure system into the cylinder space 9.

When the molding force exceeds its permissible top value, the pressure limiting valve 11 also is opened by the increasing oil pressure in press cylinder 6, whereby the retraction of cone 4 by the regulating piston 8 is aided by means of the hydraulic fluid, or the oil pressure in press cylinder 6 is limited by diversion of a given quantity of the oil to regulating piston 10, respectively. The molding force thereby immediately decreases to its rated value while valve 11 is closed again. It has been established in practice that an adjustment of cone 4 by 3 to 4 mm. generally suffices to maintain the molding pressure within the desired limits. The permissible oil pressure deviation for continuous operation is approximately ±10 kg./cm.² During the retraction of piston 2, the space 9 of the regulating cylinder 10 is relieved so that the original pressure of cone 4 again is attained or maintained, respectively. This is facilitated by opening of valve 12, which, in turn, acts on reversing valve 15 regulating the movement of piston 2. Valve 15 is connected, by way of pump 14, to hydraulic fluid reservoir 13, and also to a second pressure limiting valve 16 which is connected to the conduit leading from accumulator 7 to cylinder space 9'. The entire operation of pressing the cone against annular opening 3a, the elastic return and aiding of the return by the hydraulic fluid under high pressure from the pressure system repeats with every dual stroke of the molding piston whereby the regulating piston steadily follows the movements of the molding piston with small strokes of only approximately 3 to 5 mm. This assures attaining the most advantageous molding force at each working stroke and prevention of exceeding said force.

The regulation of the desired molding force is carried out.

(1) by the adjustment of the accumulator pressure; and
(2) by the adjustment of the opening pressure difference of pressure limiting valve 11.

The system furthermore provides a system for the automatic recharging of the accumulator and a device which permits a full retraction of cone 4 when required. The total stroke of cone 4 is approximately 100 mm.

The values given above solely relate to a special embodiment pertaining to terephthalic acid using an extruder of the following dimensions:

Mold form and piston diameter _____ mm __ 40
Length of plug _____ mm __ 350
Cone angle _____ degrees __ 60

With corresponding different values the regulator principle according to the invention is applicable to all uses of extruders for the introduction of solids into pressure vessels or their removal therefrom. These extruders may be of any desired dimensions.

Of importance for the functioning of the device according to the invention is the fact that the positioning of the counterpressure organ, in the instant case cone 4, is effected not solely by an equilibrium between the elastic force acting from accumulator tank 7 on piston 8 together with the portion of the molding force which is not introduced into the wall of the mold, but that a preregulation of the counterpressure organ is attained by the total pressure through the pressure limiting valve.

The molding force is divided into wall friction and the force acting on the counterpressure organ 4. Jamming of the mold piston 2 occurs when the plug becomes so tight that the entire mold force is taken up by the wall friction.

The preregulation of the counterpressure organ 4 effects a decrease of the total molding force at such an early stage that jamming cannot occur. The equilibrium of the molding force portions acting on the wall friction and the counterpressure is kept because the preregulation effects a relief on the plug.

The manner in which the energy is transmitted is immaterial. The regulation can be carried, e.g., by means of a hydraulic system as described.

I claim as my invention:

1. In an extruder for charging comminuted solids in the form of a plug into pressure vessels; said extruder being provided with a loading opening; a molding chamber adjacent thereto in the shape of an open hollow cylinder; a press cylinder; a retractable molding piston disposed in said press cylinder and having a portion protruding from one end of said press cylinder permitting loading when retracted and, when advanced, forming one closure of said molding chamber; said press cylinder having a fluid connection at each end; a second retractable piston having a cone extending at the one end toward said molding piston and coaxially therewith; said cone when advanced, partially entering said molding chamber and acting as a closure therefor; a second cylinder for said second piston having a fluid connection at each end; means for charging and discharging said second piston and cone; a hydraulic fluid-containing accumulator tank and conduit means operatively connected to said second piston; the improvement which comprises the other end of said press cylinder being operatively connected to said one end of said second cylinder by a hydraulic transmission line which includes a first pressure limiting valve which allows a predetermined amount of pressure to build up on the press cylinder side and a branch line parallel to the line containing said pressure relief valve; said branch line having a second valve and extending to a conduit from a reversing valve regulating the movement of said molding piston; said reversing valve being connected, by way of a pump, to a hydraulic fluid reservoir; a third line having a second pressure limiting valve is connected to said pump, said accumulator and the other end of said second cylinder; the pressure settings of said two limiting valves determining the relationship of the pressures on each side of said second piston and is stabilized by means of said accumulator, whereby when pressure is built up to the predetermined amount of said first pressure limiting valve, it allows passage of hydraulic fluid into the space at said one end of said second piston to retract the cone.

References Cited

UNITED STATES PATENTS

| 2,422,895 | 6/1947 | Habenicht | 100—244 X |
| 2,705,916 | 4/1955 | Millgord | 100—95 |
| 2,830,530 | 4/1958 | Powell | 100—244 X |
| 3,179,040 | 4/1965 | Seltzer | 100—192 X |

FOREIGN PATENTS

| 1,078,231 | 5/1954 | France. |
| 519,152 | 3/1940 | Great Britain. |

LOUIS O. MAASSEL, *Primary Examiner.*